(12) United States Patent
Dusoulier et al.

(10) Patent No.: US 9,187,366 B2
(45) Date of Patent: Nov. 17, 2015

(54) HIGH-REFLECTION GLASS PANEL

(75) Inventors: Laurent Dusoulier, Jumet (BE); Dominique Coster, Jumet (BE)

(73) Assignee: AGC Glass Europe, Brussels (BE)

( * ) Notice: Subject to any disclaimer, the term of this patent is extended or adjusted under 35 U.S.C. 154(b) by 564 days.

(21) Appl. No.: 13/576,802

(22) PCT Filed: Mar. 9, 2011

(86) PCT No.: PCT/EP2011/053517
§ 371 (c)(1),
(2), (4) Date: Aug. 2, 2012

(87) PCT Pub. No.: WO2011/110581
PCT Pub. Date: Sep. 15, 2011

(65) Prior Publication Data
US 2012/0301693 A1    Nov. 29, 2012

(30) Foreign Application Priority Data
Mar. 10, 2010    (BE) .................................. 2010/0156

(51) Int. Cl.
*B32B 7/02* (2006.01)
*C03C 23/00* (2006.01)
*C03C 17/245* (2006.01)
*C03C 17/34* (2006.01)

(52) U.S. Cl.
CPC ............. *C03C 23/007* (2013.01); *C03C 17/245* (2013.01); *C03C 17/3417* (2013.01); *C03C 2217/218* (2013.01); *C03C 2217/22* (2013.01); *C03C 2217/23* (2013.01); *C03C 2218/154* (2013.01); *Y10T 428/24967* (2015.01); *Y10T 428/266* (2015.01)

(58) Field of Classification Search
CPC .. B32B 17/06; C03C 17/245; C03C 17/3417; C03C 2217/22; C03C 2218/154; Y10T 428/24967; Y10T 428/266

USPC ........................... 428/212, 215, 337; 359/839
See application file for complete search history.

(56) References Cited

U.S. PATENT DOCUMENTS

| 2003/0224181 A1 | 12/2003 | Finley et al. |
| 2006/0159933 A1 | 7/2006 | Disteldorf et al. |
| 2008/0020211 A1 | 1/2008 | Petrmichl et al. |
| 2008/0028984 A1 | 2/2008 | Meredith et al. |
| 2009/0004412 A1* | 1/2009 | Decroupet et al. .............. 428/34 |
| 2010/0075156 A1 | 3/2010 | Petrmichl et al. |

FOREIGN PATENT DOCUMENTS

| EP | 0 911 302 | 4/1999 |
| WO | 2008 010883 | 1/2008 |
| WO | 2008 123553 | 10/2008 |
| WO | 2010 031808 | 3/2010 |

OTHER PUBLICATIONS

International Search Report Issued Apr. 8, 2011 in PCT/EP11/53517 Filed Mar. 9, 2011.

* cited by examiner

*Primary Examiner* — Aaron Austin
*Assistant Examiner* — Lawrence Ferguson
(74) *Attorney, Agent, or Firm* — Oblon, McClelland, Maier & Neustadt, L.L.P.

(57) ABSTRACT

The invention relates to a glass panel, including at least one reflective layer deposited by cathode sputtering, said layer consisting of one or more oxides of one of the metals including Ta, Nb, Zr or the mixed oxides of said metals, the thickness of the layer in question and optionally other layers present in the assembly having a refractive index greater than 2.2 being selected such that, on a 4-mm thick sheet of clear "float" glass, said layer(s) result(s) in a reflection of at least 15% and a light transmission of at least 60%, the layer or system of layers in question further having a mechanical and/or chemical resistance comparable to those of layers produced by pyrolysis for obtaining products having the same type of optical properties.

22 Claims, 1 Drawing Sheet

HIGH-REFLECTION GLASS PANEL

Figure 1:
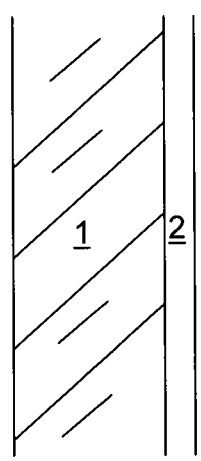

The present invention relates to glazings which have a high reflection in the visible range while retaining a significant portion of transmission.

The glazings in question are useful in particular for limiting the natural energy gain especially in buildings exposed to a lot of sunshine. The limitation of the energy gain makes it possible to economize on the need for air conditioning. The glazings in question are also characterized by their "solar factor", a measurable quantity denoting the ratio of the energy both transmitted through the glazing and reemitted by the latter toward the inside, after absorption, to the total incident energy.

Glazings of this type are usually constituted by coating the glass sheet with a layer, or with a system of layers said to be "hard". These layers are conventionally deposited by pyrolysis on the hot glass immediately after formation of the sheet. Most common is to carry out the pyrolysis "in-line", that is to say on the same glass production site. The glass ribbon constituted on the "float" line is coated while it is still at high temperature.

One recognized distinctive feature of products obtained by pyrolysis is that they are relatively hard. They withstand well both chemical and mechanical attacks. For this reason they are conveniently used, optionally by exposing the coated face to external hazards. This distinctive feature distinguishes the layers obtained by pyrolysis from those produced by sputtering vacuum deposition techniques; these two types of techniques constitute the two most widely used routes for producing thin layers on a glass support.

In contrast, the layers obtained by vacuum sputtering are said to be "soft". Their insufficient mechanical or chemical resistance means that these layers are mainly used in configurations where they are not exposed to these attacks. This is the case in multiple glazings. In these glazings, the layers are turned toward the spaces located between the sheets.

Although the use of pyrolytic layers is technically satisfactory, it is however closely linked to the availability of suitable specific precursors. The precursors available do not make it possible to produce all of the attainable layers. Moreover, the use of pyrolysis techniques requires the presence of specific, very expensive facilities that must be integrated into production lines which, by nature and economies of scale, are inevitably limited in number and therefore geographically distributed in a discrete manner over the territories for which these products are intended.

The facilities for coating by vacuum sputtering are independent of that of manufacture of the glass. The coating operations via these techniques are carried out "off-line" according to the standard terminology, in other words on glass which has been manufactured previously and which in the meantime may have been stored, transported, re-cut, etc.

For logistical reasons in particular, the possibility of providing glazings coated by sputtering that offer the qualities of products obtained by pyrolysis is one objective of the invention. It is obviously necessary that the production cost of these glazings remains comparable to that of glazings coated by pyrolysis.

Layers deposited by vacuum sputtering and which result in advantageous solar factors are known. This is in particular the case for layers of titanium oxide. These layers display however, as indicated previously, an insufficient mechanical resistance in order to be able to be used, apart from on the unexposed faces of the glazings considered.

The inventors have shown that a very specific choice of the materials constituting these layers deposited by sputtering made it possible to attain the resistance requirements indicated.

The inventors have also shown that, via a suitable choice of the layers or systems of layers produced, it is also possible to subject the glazings in question to powerful subsequent heat treatments, such as bending or tempering treatments without however adversely affecting the essential characteristics conferred by these layers.

The layers or systems of layers, considered according to the invention, do not contain any infrared-reflecting metal-type layers, especially silver-based layers, the systems comprising these silver-based layers systematically displaying a certain weakness with respect to external attacks.

The objective of the invention is to provide glazings responding to the requirements stated above.

The inventors have shown that this objective could be achieved by glazings as defined in claim 1. It is noteworthy that the layers chosen and produced by sputtering deposition make it possible to achieve the desired characteristics, especially of resistance, such that they may advantageously replace certain layers deposited by pyrolysis.

The oxides of tantalum, niobium and zirconium under consideration, or the mixed oxides of these metals, are such as obtained by sputtering, whether the cathodes are ceramic or metallic, under conditions such that the layers formed do not have an absorption coefficient k of greater than 0.01.

Preferred reflective layers are niobium oxide layers or, optionally mixed niobium and zirconium oxide layers, the Zr/Nb atomic ratio of which is from 25% to 75%.

The mechanical and chemical resistance of the reflective layer depends on its composition, it also depends on its thickness. Although an increase in thickness is accompanied by increased resistance, beyond a certain threshold the improvement is not significant, the additional cost for a thicker deposition becomes pointless.

Preferably, the reflective layer according to the invention has a thickness between 150 and 900 Å, preferably between 200 and 700 Å, and advantageously from 250 to 500 Å.

The choice of the thickness of the reflective layer also depends on the presence of other layers, but also on the desired properties in terms of reflection, transmission and absorption of the incident light. For the glazings according to the invention, the reflection which is generally at least 15% when the layer or system of layers is applied to clear glass with a thickness of 4 mm, is advantageously between 20% and 40% under the same conditions.

The characteristics of the reflective layer, or of the system of layers in which it is included, in particular its index, determine the reflection obtained but also the other optical quantities, especially the light transmission. For the glazings according to the invention, the light transmission being at least 60%, the light absorbed by the glazing remains relatively low. It is advantageously less than 20% and preferably less than 10%.

In the glazings according to the invention, the reflective layer based on zirconium, tantalum or niobium oxide or on a mixed oxide of several of these metals may be combined with other layers in order to improve the properties thereof or to confer properties thereon that it alone would not have or would not have to a suitable degree for the envisaged use.

The protection conferred by the reflective layer according to the invention does not necessarily mean that the reflection originates exclusively from this layer. Once the necessary resistance is obtained, the system of layers may include other layers in particular for contributing to the reflection. From this viewpoint, a layer having a high reflection and therefore having a high index may be combined. These layers then have a refractive index of greater than 2.2. Particularly preferred high-index layers are layers of titanium oxide, whether stoichiometric or not (TXO, which layers may especially be obtained by using ceramic cathodes), or else titanium oxynitride layers containing a low proportion of nitrogen (N/O atomic ratio of less than 10%). These layers have an index of the order of 2.45-2.50. The combination of a layer of this type with a reflective layer according to the invention therefore if necessary makes it possible to simultaneously benefit from a good resistance conferred by the latter layer, and overall from a higher index.

Similarly, the reflective layer may also be combined with a layer having a particularly high mechanical and/or chemical resistance and that also has reflective properties. This layer, inevitably a surface layer, may be relatively thin, most of the reflection being provided by a layer located underneath this outer protective layer. In practice, this layer may have a thickness of a few tens of Angströms. 50 Å or less may suffice. Of course, the layer in question may be thicker, but in this case its role in establishing the reflection is significantly larger.

In the main role of protective layer, the thickness does not normally exceed 100 Å. A material that satisfies these conditions is, for example, a mixed oxide of titanium and of one of the metals listed for forming the reflective oxides according to the invention. Titanium oxide alone, as mentioned previously, does not offer adequate qualities, especially mechanical qualities. In combination with the metals in question its structure is modified and its properties too. The combination in particular of titanium and zirconium results in highly resistant layers. Preferred mixed oxides of this type are constituted in particular for substantially equal proportions by weight of zirconium oxide (46%) and titanium oxide (50%).

The use of glazings according to the invention may take place with no other modification than cutting to the desired dimensions and introducing into frames. The glazings in question in this case are essentially flat. The need for cutting to the dimensions after the coating, means that the glass sheets being incorporated into the composition of these glazings are not first subjected to a heat treatment. The heat treatments in question, by ensuring the presence of stresses, give the glazings mechanical properties that ensure both a better impact resistance and above all, in the case of a violent impact, mean that these glazings break into multiple fragments of small dimensions.

When it is desired to have glazings that are either curved or tempered, it is necessary to undergo a high-temperature heat treatment after the application of the layers. These treatments take the glazings to temperatures which exceed 550° C. and often 600° C., for a relatively long time. In the case of curving or bending, the transformation may thus make it necessary to hold these temperatures for several minutes considering, in particular, the thermal inertia of the glass. The hold time at these temperatures may reach 5 minutes or more depending on the techniques used and the thickness of the sheets treated.

Heat treatments of tempering or bending type are known for being capable of adversely affecting the thin layers deposited on the glass sheets. Independently of the adverse changes which may appear in the structure of certain layers due to the very reason of the temperature, the glass substrate may also induce undesirable modifications.

The sheets of soda-lime-silica type glass, in other words the most common glasses, subjected to high temperatures may result in an adverse change of the layers with which they are coated. At the temperatures considered in particular the alkali metal constituents of these glasses are capable of migrating and of diffusing into the layers in contact with the glass. The diffusion of these mobile elements often leads to the appearance of a more or less pronounced haze.

The appearance of haze corresponds to a mechanism of light scattering due to the presence of foreign elements in the structure of the layer.

In practice, the products used must be highly transparent. The proportion of scattered light relative to the transmitted light must not exceed 2% and preferably must not exceed 1%. These limits may be exceeded if no precaution is taken in order to protect the layers according to the invention.

In order to prevent diffusion phenomena, especially diffusion of the alkali metal ions of the glass, it is known to have layers that oppose the passage of these ions, which layers are interposed between the substrate and the layer to be protected. Protective layers of this type are, in particular, $SiO_2$ layers. Although their barrier quality is well known, their production by sputtering remains relatively expensive. Insofar as it is desirable to deposit all of the layers in the same manner and in a single pass, it may be preferable to substitute, for the silica layers, layers that have similar properties but that are easier to produce.

According to the invention, as a layer that blocks the diffusion of the constituents of the substrate in the reflective layer, the use of either a layer of $SiO_2$, or at least one layer based on tin oxide or else a layer of silicon nitride or silicon oxynitride is proposed.

When a layer based on tin oxide is used, it comprises at least 30% and preferably at least 40% by weight of tin oxide.

The layer based on tin oxide also preferably comprises zinc oxide. The combination of these two oxides offers the advantage, in addition to a high deposition rate by sputtering techniques, of resulting in layers, the structure of which is very stable under the heat treatments considered.

Zinc oxide alone is not desirable as a layer that blocks the diffusion due to its tendency to constitute columnar structures, in particular when its thickness exceeds about 10 nanometers, which structures do not adequately block the diffusion.

The combination of the zinc and tin oxides prevents the formation of columnar structures as long as the tin oxide content remains sufficient.

The presence of a layer that blocks the diffusion of the constituents of the glass modifies the optical properties of the glazing. In particular, the presence of a layer based on tin oxide, the refractive index of which is lower than that of the reflective layer according to the invention, modifies the reflection of the assembly.

So as not to excessively reduce the reflection of the glazing, it is preferable to be sure, when a layer based on tin oxide is used, to correctly adapt its thickness. The latter is preferably less than 1.2 times the thickness of the reflective layer or system of reflective layers according to the invention.

The layer or systems of layers used according to the invention must also result in glazings for which the coloring induced by these layers meets the demand of the market. Certain colorations, especially in reflection, must be eliminated. This is the case, in particular, for overall "purple" colorations. Advantageously, according to the invention, the colorations, when analyzed in the CIE (International Commission on Illumination) system have the parameters $a^*$ and $b^*$ corresponding to the following conditions for an illuminant D and for a solid angle of 10° at most: $a^* \leq 0$ and $b^* \leq 6$.

It is particularly important to systematically have a non-positive $a^*$. For the negative values of $a^*$, the coloration is either slightly blue or slightly green.

These colorations in reflection are acceptable even though the preference is color neutrality.

It is also preferable, in the case of a heat treatment, that the latter does not lead to a significant modification of the coloration in reflection. When the products offer substantially the same colorations it is possible to use, in one and the same assembly, products that are for example curved and other products which are not curved, with no difference in appearance. The products can be juxtaposed without detracting from the esthetics.

In practice, the more "neutral" the products are, the more their coloration, before and after heat treatment, enables them to be juxtaposed.

In practice, glazings corresponding to these coloration requirements preferably have, before and after heat treatment, variations of a* and b* such that $\Delta E^* \leq 2$ and advantageously $\Delta E^* \leq 1$, with:

$$\Delta E^* = (\Delta a^{*2} + \Delta b^{*2})^{1/2}$$

Apart from the layers that determine the optical characteristics of the glazings according to the invention, and for the purpose of protecting these layers even more against the risks of deterioration in subsequent operations, especially storage and transport operations, it is possible and advantageous to cover these layers with a temporary coating that is removed before the installation of these glazings.

It is known to cover the glazings with various soluble wax or polymer films which can be removed by washing. These products may be used to protect the layers produced according to the invention.

The use of these protective products requires two additional operations on the glazings, the application, on the one hand, and the subsequent washing, on the other hand. In the case of glazings that have to undergo a heat treatment, it is preferable to use a carbon coating, which may be integrated into the sputtering deposition operations, and the removal of which takes place itself during the heat treatment by combustion in contact with the air.

The glazings according to the invention are constituted from glass sheets of various thicknesses. They may also be constituted of sheets of glass that are clear or colored in the bulk, mainly to give them esthetic characteristics, but also optionally to develop their optical-energetic properties.

It is possible to use glasses that are more absorbent than clear glasses, especially gray glasses or glasses that are predominantly slightly blue or green. Preferably, when colored glasses are used, the dominant wavelength in reflection $\lambda_m$ for an illuminant D65 under a solid angle of 2°, is between 475 and 600 nm.

The invention is described in detail below by exemplary embodiments of the invention, where appropriate by referring to the appended drawings in which FIGS. 1 to 4 are schematic representations of glazings according to the invention.

FIG. 1 shows a glazing 1 comprising a reflective layer 2 according to the invention. The respective thicknesses are not abided by for the sake of clarity.

Figure 2:
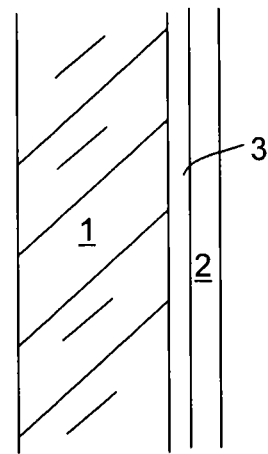

FIG. 2 is a glazing according to the invention which, in addition to the reflective layer 2, comprises a layer 3, the role of which is to block the diffusion of constituents of the glass sheet 1. The layer is advantageously constituted on the basis of tin oxide, preferably in combination with zinc oxide. Layers of silicon oxide, nitride or oxynitride may also be involved.

Figure 3:
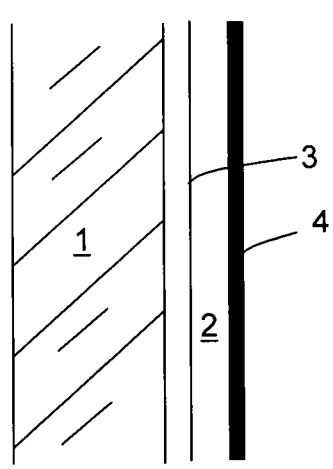

FIG. 3 represents a glazing according to the invention which, in addition to the preceding layers, comprises a protective coating 4. The coating in question, which is applied temporarily, has the main role of preventing scuffs, scratches and other adverse mechanical changes capable of reaching the functional layers 3. This layer, in the case of glazings that undergo a heat treatment subsequent to the formation of the functional layers, is advantageously constituted of a material which is removed by combustion during this heat treatment. A layer of carbon is particularly advantageous for constituting this coating.

Figure 4:
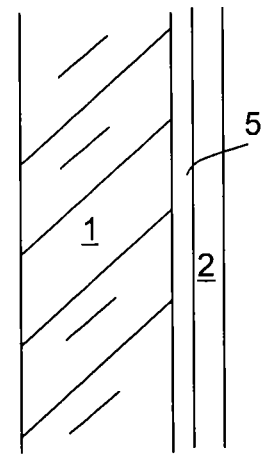

FIG. 4 presents a glazing comprising two superposed reflective layers. The additional layer 5 advantageously has a refractive index greater than that of the reflective layer 2 in order to increase the reflection.

The products according to the invention are analyzed, in particular, for their qualities of mechanical and/or chemical resistance. The tests to which they are subjected are the same as those which are used for evaluating similar glazings, the functional layers of which are produced by pyrolysis. The glazings according to the invention must attain equivalent performances.

The tests systematically comprise moisture resistance tests (21 days in a climatic chamber), chemical resistance tests (neutral salt spray for 21 days and exposure to $SO_2$ for five cycles), an abrasion resistance test (AWRT for Automatic Wet Rub Test) and a scratch resistance test (DBT for Dry Brush Test). The chemical resistance tests are those described in standard EN 1096-2. The abrasion tests are specific to the tests for layers deposited by "magnetron sputtering". These two tests are substantially more "severe" than the analogous tests described in the standard indicated above. In other words, the abrasion tests that are passed in the examples carried out are inevitably satisfied under the conditions of this standard.

The test in a climatic chamber consists in exposing the sample in an oven maintained at 40° C.±1.5° C. for 21 days. The test is passed when the sample remains free of marks. The aging under these conditions for each day corresponds to an exposure of one year to standard atmospheric hazards.

The sample must not be faded, nor generally suffer defects of any nature whatsoever, such as detachment of the layer.

The test of resistance to the acid atmosphere is carried out in the following way:

The sample is placed in a chamber charged with an acid atmosphere (two liters of water per 2 liters of $SO_2$) brought to 40° C. for 8 hours. Brought back to ambient temperature, the sample remains in the atmosphere in question for another 16 hours. The same cycle is repeated 4 times. The layer must not be detached.

The wet rub test "AWRT" (automatic wet rub test) is carried out with a circular head of Teflon coated with a cotton fabric (ADSOL ref. 40700004). This is placed under a load of 1050 g on the layer. The cotton is kept wet during the test with demineralized water. The frequency of the oscillations is from 60 to 90 per minute. The samples are observed in order to detect the adverse changes of the layer.

The dry brush test "DBT" is carried out on an Erichsen device (model 494) equipped with a standardized brush (ASTM D2486). Each fiber of the brush has a diameter of 0.3 mm. The fibers are grouped into bundles having a diameter of 4 mm. The total weight applied by the brush and its support is 454 g. The test comprises 1000 back and forth cycles.

The measurements of the optical quantities are carried out according to standard EN 410.

The samples are produced on sheets of clear "float" glass having a thickness of 4 mm.

EXAMPLES 1 AND 1'

A zirconium oxide layer having a thickness of 500 Å is deposited.

The tests of chemical and mechanical resistance are satisfactory. The optical properties of the sample are in transmission, reflection glass side glass side (under 2°) and for the colorimetric data (illuminant D65 under 10°) in transmission and in reflection:

| TL | Rg | a* trans. | b* trans. | a* ref. | b* ref. |
|---|---|---|---|---|---|
| 71.1 | 24.3 | 0.1 | 2.2 | −1.9 | −3.7 |

After heat treatment at 670° C. for 8 minutes 30 seconds the properties of this sample become:

| TL | R | a* trans. | b* trans. | a* ref. | b* ref. | ΔE* ref. |
|---|---|---|---|---|---|---|
| 73.6 | 24.3 | 0.1 | 2.0 | −1.9 | −3.8 | 0.1 |

EXAMPLES 2, 3, 4 AND 5 AND 2', 3', 4', 5'

The samples comprise a layer of tantalum oxide as a reflective layer and a sublayer of tin oxide. The respective thicknesses of these layers are in Å:

| | Example | | | |
|---|---|---|---|---|
| | 2 | 3 | 4 | 5 |
| $SnO_2$ | 100 | 300 | 300 | 170 |
| TaO | 200 | 500 | 200 | 380 |

The tests of chemical and mechanical resistance are satisfactory. The optical properties of the sample are in transmission, reflection layer side (under 2°) and for the colorimetric data (illuminant D65 under 10°) in transmission and in reflection, before heat treatment and after this treatment:

| | TL | Rc | a* trans. | b* trans. | a* ref. | b* ref. | ΔE* ref. |
|---|---|---|---|---|---|---|---|
| before 2 | 81.1 | 16.6 | −0.8 | 3.6 | −1.3 | 7.7 | |
| after 2' | 82.2 | 15.6 | −0.8 | 2.9 | 1.3 | −6.9 | 0.8 |
| before 3 | 72.9 | 24.6 | −0.4 | −3.0 | −2.0 | 9.8 | |
| after 3' | 76.5 | 21.1 | −0.7 | −3.5 | −1.0 | 10 | 1.0 |
| before 4 | 74.3 | 23.3 | −0.4 | 4.0 | −2.1 | −5.4 | |
| after 4' | 76.1 | 21.5 | −0.4 | 2.8 | −1.8 | −5.1 | 0.5 |
| before 5 | 72.9 | 24.7 | −0.2 | 2.8 | −2.2 | −3.5 | |
| after 5' | 74.1 | 23.5 | −0.2 | 2.3 | −1.9 | −3.7 | 0.3 |

EXAMPLES 6, 7 AND 6', 7'

The systems of layers are constituted of a reflective zirconium oxide layer and of a tin oxide sublayer. The composition of the layers is in Å:

| | Example | |
|---|---|---|
| | 6 | 7 |
| $SnO_2$ | 100 | 250 |
| $ZrO_2$ | 500 | 250 |

| | TL | Rg | a* trans. | b* trans. | a* ref. | b* ref. | ΔE* ref. |
|---|---|---|---|---|---|---|---|
| before 6 | 71.8 | 26.1 | 0.2 | 0.9 | −2.1 | −1.0 | |
| after 6' | 72.7 | 25.3 | 0.2 | 1.1 | −1.9 | −2.0 | 1.0 |
| before 7 | 73.8 | 24.1 | 0.0 | 3.7 | −2.1 | −5.4 | |
| after 7' | 75.5 | 22.5 | 0.0 | 2.9 | −1.8 | −5.7 | 0.5 |

EXAMPLES 8, 8' AND 9, 9'

For these examples, the reflective layer is either based on niobium oxide (8 and 8') or on a mixed oxide of niobium and tantalum (Nb/Ta approximately ⅓) (9 and 9'). The thickness of the layer is 200 Å. Positioned underneath the reflective layer is a 300 Å layer of tin oxide.

These assemblies are mechanically and chemically resistant. Their optical properties, like for the preceding examples, are reported in the table below. The reflection is observed on the layer side.

| | TL | Rc | a* trans. | b* trans. | a* ref. | b* ref. | ΔE* ref. |
|---|---|---|---|---|---|---|---|
| before 8 | 72.5 | 25.0 | −0.3 | 4.5 | −2.1 | −6.0 | |
| after 8' | 73.7 | 23.6 | −0.3 | 3.3 | −1.8 | −5.5 | 0.6 |
| before 9 | 73.0 | 24.5 | −0.3 | 3.9 | −2.2 | −5.1 | |
| after 9' | 72.9 | 24.6 | −0.2 | 2.8 | −1.9 | −4.5 | 0.7 |

EXAMPLES 10 TO 13 AND 10' TO 13'

For these examples, the layers make an assembly, of which 10, 11 and 13 comprise three elements. Starting from the glass support in all cases, a first layer is intended to prevent the diffusion from the glass of the most mobile ions such as sodium. This is either a layer of tin oxide or of silicon nitride. The single reflective layer ($ZrO_2$) or double reflective layer ($TiO_2$ and $ZrO_2$) has a high refractive index.

Examples 13 and 13' have a surface layer of a mixed oxide of titanium and zirconium (weight ratio: 50% and 46%). This layer is relatively thin and, alone, would not be sufficient to offer sufficient reflection, which results from the presence of a thick layer of zirconium oxide.

The layers of each example are the following and their thickness is in Å:

| | Example | | | |
|---|---|---|---|---|
| | 10 | 11 | 12 | 13 |
| $SnO_2$ | 150 | | | 150 |
| $Si_3N_4$ | | 150 | 150 | |
| $TiO_2$ | 100 | | 100 | |
| $ZrO_2$ | 400 | 430 | 300 | 430 |
| TZO | | | | 50 |

The optical properties of these assemblies are reported in the table below. As above, the layers are tested before and after heat treatment. The reflections are measured on the glass side.

|  | TL | Rv | a* trans. | b* trans. | a* ref. | b* ref. | ΔE* ref. |
|---|---|---|---|---|---|---|---|
| before 10 | 68.9 | 28.3 | 0.4 | −0.6 | −2.9 | 2.1 | |
| after 10' | 68.4 | 28.7 | 0.4 | −0.3 | −2.8 | 0.8 | 1.3 |
| before 11 | 72.2 | 25.1 | 0.2 | 1.4 | −2.6 | −2.0 | |
| after 11' | 73.6 | 24.0 | 0.1 | 1.6 | −2.5 | −2.9 | 0.9 |
| before 12 | 70.2 | 27.1 | 0.3 | 2.9 | −2.6 | −4.2 | |
| after 12' | 72.2 | 25.0 | 0.1 | 3.2 | −2.5 | −2.4 | 1.2 |
| before 13 | 71.2 | 26.1 | 0.2 | 0.5 | −2.7 | −0.1 | |
| after 13' | 71.6 | 25.9 | 0.3 | 1.0 | −2.6 | −1.5 | 1.4 |

The invention claimed is:

1. A glazing comprising:
   a reflective layer deposited by vacuum sputtering, the reflective layer comprising at least one oxide selected from the group consisting of an oxide of Ta, an oxide of Nb, an oxide of Zr, and any mixed oxide of Ta, Nb, Zr, or any combination thereof,
   wherein a thickness of the reflective layer and any other layers having a refractive index of greater than 2.2 in the glazing are such that, on a sheet of clear "float" glass having a thickness of 4 mm, the glazing has a reflection of at least 20% and a light transmission of at least 60%, and
   the reflective layer has mechanical, chemical, or both mechanical and chemical resistance comparable to a resistance of a layer obtained by a process comprising pyrolysis for obtaining a product having comparable optical properties.

2. The glazing of claim 1, wherein the reflective layer is a layer of niobium oxide.

3. The glazing of claim 1, wherein the reflective layer is a layer of a mixed niobium zirconium oxide.

4. The glazing of claim 3, wherein the layer of mixed oxide has a Zr/Nb atomic ratio of 25% to 75%.

5. The glazing of claim 1, wherein a thickness of the reflective layer is such that, applied to a sheet of clear "float" glass having a thickness of 4 mm, the reflection of the glazing is from 20% to 40%.

6. The glazing of claim 5, wherein the reflective layer is such that, applied to a sheet of clear "float" glass having a thickness of 4 mm, an absorption of the glazing is less than 20% of incident light.

7. The glazing of claim 1, wherein the reflective layer has a thickness between 150 and 900 Å.

8. The glazing of claim 1, wherein the reflective layer satisfies tests of resistance to condensation, to salt spray, and to acidity, as defined in the standard EN 1096-2.

9. The glazing of claim 1, wherein a color in reflection in a CIE system is such that under illuminant D and under a solid angle of 10° relative to a normal to the glazing, a*≤0 and b*≤6.

10. The glazing of claim 1, wherein, when the glazing is subjected to a heat treatment of at least 550° C. for 5 minutes, a haze measured does not exceed 2%.

11. The glazing of claim 1, further comprising: a second layer of oxide having a refractive index greater than a refractive index of the reflective layer, between the reflective layer and a glass sheet.

12. The glazing of claim 11, wherein the second layer is a layer of optionally slightly substoichiometric titanium oxide or a layer of titanium oxynitride with a N/O atomic ratio of less than 10%.

13. The glazing of claim 1, further comprising:
   a layer comprising tin oxide between a glass sheet and the reflective layer.

14. The glazing of claim 13, wherein the layer comprising tin oxide comprises at least 30% by weight of tin oxide, the remainder essentially consisting of zinc oxide.

15. The glazing of claim 14, wherein the layer comprising tin oxide has a thickness not greater than 1.2 times a thickness of the reflective layer.

16. The glazing of claim 1, further comprising:
   a layer configured to protect against abrasion, a layer of carbon deposited by sputtering, or a polymer layer, covering the reflective layer.

17. The glazing of claim 16, wherein a protective layer has been removed by a heat treatment of bending/toughening type.

18. The glazing of claim 1, wherein the glazing is a sheet colored in bulk with, in reflection, a dominant wavelength $\lambda_m$ between 475 and 600 nm under illuminant D65 and a 2° solid angle.

19. The glazing of claim 1, further comprising:
   a layer configured to block migration of ions from a substrate, the layer consisting of silicon oxide, silicon nitride, or silicon oxynitride, between a glass sheet and the reflective layer.

20. The glazing of claim 1, wherein the glazing does not comprise any silver-based layers.

21. A glazing, comprising:
   an antireflection coating consisting essentially of:
      a reflective layer deposited by vacuum sputtering, the reflective layer comprising at least one oxide selected from the group consisting of an oxide of Ta, an oxide of Nb, an oxide of Zr, and any mixed oxide of Ta, Nb, Zr, or any combination thereof,
   wherein a thickness of the reflective layer and any other layers having a refractive index of greater than 2.2 in the glazing are such that, on a sheet of clear "float" glass having a thickness of 4 mm, the glazing has a reflection of at least 20% and a light transmission of at least 60%.

22. A glazing, comprising:
   an antireflection coating consisting of the following layers:
      an optional protective layer for blocking diffusion of constituents of the substrate;
      a reflective layer deposited by vacuum sputtering, the reflective layer comprising at least one oxide selected from the group consisting of an oxide of Ta, an oxide of Nb, an oxide of Zr, and any mixed oxide of Ta, Nb, Zr, or any combination thereof;
      an optional protective coating deposited on the antireflection coating; and
      an optional layer having a refractive index greater than that of the reflective layer,
   wherein a thickness of the reflective layer and any other layers having a refractive index of greater than 2.2 in the glazing are such that, on a sheet of clear "float" glass having a thickness of 4 mm, the glazing has a reflection of at least 20% and a light transmission of at least 60%.

* * * * *